United States Patent [19]
Giglia

[11] 4,076,386
[45] Feb. 28, 1978

[54] SEGMENTED ELECTROCHROMIC DISPLAY GENERAL

[75] Inventor: Robert Domenico Giglia, Rye, N.Y.

[73] Assignee: American Cyanamid Company, Stamford, Conn.

[21] Appl. No.: 663,402

[22] Filed: Mar. 3, 1976

Related U.S. Application Data

[63] Continuation-in-part of Ser. No. 411,575, Oct. 31, 1973, abandoned.

[51] Int. Cl.² ............................................. G08B 5/36
[52] U.S. Cl. ............................................. 350/357
[58] Field of Search ............................... 350/160 R

[56] References Cited
U.S. PATENT DOCUMENTS

| | | | |
|---|---|---|---|
| 3,704,057 | 11/1972 | Beegle | 350/160 R |
| 3,708,220 | 1/1973 | Meyers et al. | 350/160 R |
| 3,827,784 | 8/1974 | Giglia et al. | 350/160 R |
| 3,836,229 | 9/1974 | Saurer | 350/160 R |

*Primary Examiner*—William L. Sikes
*Attorney, Agent, or Firm*—Bruce F. Jacobs

[57] ABSTRACT

Disclosed is a segmented electrochromic display and imaging device which provides for the operation of separate discrete display segments within a unitary structure formed by sandwich arrangement of imaging elements, a common counter-electrode and a common electrolyte layer. The device can be used for animated pictorial information and alpha numeric information.

6 Claims, 5 Drawing Figures

SEGMENTED ELECTROCHROMIC DISPLAY GENERAL

This is a continuation-in-part of copending application Ser. No. 411,575 filed Oct. 31, 1973 by the same inventor and now abandoned.

BACKGROUND OF INVENTION

The invention relates to electro-optical devices whose electromagnetic radiation absorption characteristics can be selectively altered by influence of a suitably controlled electric field. More particularly, the invention is concerned with an electro-optical device for displaying animated pictorial information and alpha numeric information. It particularly relates to an electro-optical device exhibiting a phenomenon known as electrochromism in which separate discrete display segments are operated and arranged in a unitary structure with common electrolyte and counter-electrode elements.

In commonly assigned, copending U.S. application, Ser. Nos. 41,153; 41,154; and 41,155, all filed May 25, 1970, Ser. No. 41,153, abandoned and refiled as Ser. No. 211,857, Dec. 23, 1971, abandoned and refiled as Ser. No. 361,760, May 18, 1973, now U.S. Pat. No. 3,879,108; Ser. No. 41,154, abandoned and refiled as Ser. No. 609,251, Apr. 13, 1973, now pending; Ser. No. 41,155, now U.S. Pat. No. 3,708,220; and U.S. Pat. Nos. 3,521,941 and 3,578,843, there are described electro-optical devices exhibiting a phenomenon known as persistent electrochromism wherein electromagnetic radiation absorption characteristic of a persistent electrochromic material is altered under the influence of an electric field. Such devices were employed in sandwich arrangement between two electrodes. Coloration was induced by charging the electrochromic film negative with respect to the counter-electrode, employing an external potential. The counter-electrode can be the same as the persistent electrochromic material or different.

By reversing the original polarity of the field or by applying a new field, it was also possible to cancel, erase or bleach the visible coloration.

These steps of color induction and erasure are defined as cycling.

In order to display changing information, prior art arrangements have employed series of separate electrochromic display units or a moving "color front" On a single electrochromic unit.

It is an object of this invention to provide an electrochromic imaging device providing for the operation of separate electrochromic elements within a single electrochromic display in which the counter-electrode and electrolyte spacing layer are common to all the electrochromic elements.

SUMMARY OF THE INVENTION

The image display device is formed in a sandwich arrangement of a segmented electrochromic layer as an imaging area and a common counter-electrode with a spacing of a common conducting medium, e.g. an electrolyte, between the areas. Means are provided for supplying electric current to the counter-electrode layer. Any conventional means is suitable. A particularly advantageous means for electrical connection is to deposit the separate electrochromic imaging segments and counter-electrode on a conductive surface, such as NESA glass. Separate electronic circuits can be scribed or etched in the transparent conductive substrate to provide circuits for the electrochromic segments. It is particularly advantageous to incorporate an electrochromic material with the counter-electrode which is identical to that used for the imaging area. This provides greater compatibility between imaging area and counter-electrode, and allows the device to operate on lower voltage.

DETAILED DESCRIPTION OF INVENTION

As used herein, a "persistent electrochromic material" is defined as a material responsive to the application of an electric field of a given polarity to change from a first persistent state in which it is essentially non-absorptive of electromagnetic radiation in a given wavelength region, to a second persistent state in which it is absorptive of electromagnetic radiation in the given wavelength region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

Electrochromic Materials

The materials which form the electrochromic materials of the device in general are electrical insulators or semiconductors. Thus are excluded those metals, metal alloys, and other metal-containing compounds which are relatively good electrical conductors.

The persistent electrochromic materials are further characterized as inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "Inorganic Chemistry", T. Moeller, John Wiley & Sons, Inc., New York, 1952.

These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfides of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are the following oxides: MO oxides, e.g. MnO, NiO, CoO, etc.; $M_2O_3$ oxides, e.g., $Cr_2O_3$, $Fe_2O_3$, $Y_2O_3$, $Yb_2O_3$, $V_2O_3$, $Ti_2O_3$, $Mn_2O_3$, etc.; $MO_2$ oxides, e.g., $TiO_2$, $MnO_2$, $ThO_2$, etc.; $M_3O_4$ oxides, e.g., $Co_3O_4$, $Mn_3O_4$, $Fe_3O_4$, etc.; $MO_3$ oxides, e.g., $CrO_3$, $UO_3$, etc.; $M_2O_5$ oxides, e.g., $V_2O_5$, $Nb_2O_5$, $Ta_2O_5$ etc.; $M_4O_6$ oxides; $M_2O_7$ oxides, e.g., $V_2O_5$, $Nb_2O_5$, $Ta_2O_5$m etc.; $M_4O_6$ oxides; $M_2O_7$ oxides such as $M_2O_7$; complex oxides such as those of the formula $XYO_2$ (X and Y being different metals), e.g., $LiNiO_2$, etc.; $XYO_3$ oxides, e.g., $LiMnO_3$, $FeTiO_3$, $MnTiO_3$, $CoTiO_3$, $NiTiO_3$, $LiNbO_3$, $LiTaO_3$, $NaWO_3$, etc.; $XYO_4$ oxides, e.g., $MgWO_4$, $CdWO_4$, $NiWO_4$, etc.; $XY_2O_6$, e.g., $CaNb_2O_6$("Niobite" oxides); $X_2Y_2O_6$, e.g., $Na_2Nb_2O_6$: Spinel structure oxides, i.e., of the formula $X_2YO_4$, e.g., $Na_2MoO_4$, $NaWO_4$, $Ag_2MoO_4$, $Cu_2MoO_4$, $Li_2MoO_4$, $Li_2WO_4$, $Sr_2TiO_4$, $Ca_2MnO_4$, etc.; $XY_2O_4$, e.g., $FeCr_2O_4$, $TiZn_2O_4$, etc.; $X_2YO_5$ oxides, e.g., $Fe_2TiO_5$, $Al_2TiO_5$, etc.; and $X_3Y_3O$ (ternary) oxides, e.g., $Mo_3Fe_3O$, $W_3Fe_3O$, $X_3Ti_3O$ (where X is Mn, Fe, Co, etc.) For a discussion of some complex oxides, see Advanced Inorganic Chemistry, Cotten & Wilkinson, p. 51, (1966), Interscience Publishers, Inc., New York and Progress in Inorganic Chem., Vol. 1, 465 (1959) Interscience Publishers, Inc., New York. Also included are nitrides, and the sulfides corresponding to the above oxides. Hydrates of certain metal oxides may also be used, e.g., $WO_3.H_2O$, $WO_3.2H_2O$, $MoO_3.H_2O$ and $MoO_3.2H_2O$.

A particularly advantageous aspect in the present invention is the use of two separate layers of identical electrochromic materials one layer being employed in the counter-electrode for the other layer. A preferred embodiment consists of tungsten oxide as the electrochromic color electrode and tungsten oxide and graphite as the counter-electrode.

While the general mechanism of persistent electrochromism is unknown, the coloration is observed to occur at the negatively charged electrochromic layer. Generally the phenomenon of persistent electrochromism is believed to involve cation transport such as hydrogen or lithium ions to the negative electrode where color centers form in the electrochromic image layer as a result of charge compensating electron flow.

When the persistent electrochromic materials are employed as films, thickness desirably will be in the range of from about 0.1-100 microns. However, since a small potential will provide an enormous field strength across very thin films, the latter, i.e., 0.1-10 microns, are preferred over thicker ones. Optimum thickness will also be determined by the nature of the particular compound being laid down as a film and by the film-forming method since the particular compound and film-forming method may place physical (e.g., non-uniform film surface) and economic limitations on manufacture of the devices.

The films may be laid down on any substrate which, relative to the film, is electrically conducting. The electrically conductive material may be coated on another suitable substrate material including glass, wood, paper, plastics, plaster, and the like, including transparent, translucent, opaque or other optical quality materials. A preferred embodiment in the instant device would employ at least one transparent electrode.

When tungsten oxide is employed as the electrochromic imaging material and an electric field is applied between the electrodes, a blue coloration of the previously transparent electrochromic layer occurs, i.e., the persistent electrochromic layer becomes absorptive of electromagnetic radiation over a band initially encompassing the red end of the visible spectrum, thereby rendering the imaging layer blue in appearance. Prior to the application of the electric field, the electrochromic imaging layer was essentially non-absorbent and thus transparent.

Spacing Layer

A semi-solid ion conductive gel may be employed as the common ion-conducting material. One embodiment comprises in combination sulfuric acid and a gelling material for the acid. Any gelling agent which is patible with the other components is suitable. Particularly advantageous gelling agents are polyvinyl alcohol, polyacrylamide, sodium silicate, cabo-sil, and the like.

A preferred embodiment employs $H_2SO_4$ in combination with polyvinyl alcohol. The properties of this gel may be varied in advantageous manner by employing polyvinyl alcohol of various molecular weights, differing sulfuric acid concentration and different polyvinyl alcohol to acid ratios. Thereby, gels can be produced to give a specific conductivity in the range of from about 0.10 to 0.60 ohm$^{-1}$cm$^{-1}$.

A distinct advantage of the above mentioned gels is their high ionic conductivity and good chemical stability. We have found that both requirements are unexpectedly met by gels in the preferred conductivity range of 0.20–0.40 ohm$^{-1}$cm$^{-1}$.

Other materials may be incorporated into the gel to vary the physical properties of the gel such as viscosity and vapor pressure. Thus, the composition may optionally include organic solvents such as dimethyl formamide, acetonitrile, proprionitrile, butyrolacetone and glycerin.

Further, the gels used in the instant invention may be made opaque with, for example, stable, white or colored pigments such as $TiO_2$ or $TiO_2$ doped with Ni, Sb for use in certain electrochromic display device applications. A fluid layer containing an acid may also be used in place of the gel, as disclosed in copending, commonly assigned application Ser. No. 41,154, filed May 25, 1970.

The spacing layer may also be made ionically conductive by a semi-solid material such as a paste, grease or gel containing some ionically conducting materials. The dispersing medium may be one selected from a group consisting of an ionically conductive paste, grease or gel. A preferred embodiment in the present invention comprises the use of a conductive lithium stearate grease containing dispersed therein propylene carbonate and p-toluene sulfonic acid. The semi-solid medium can contain one or more salts selected from Group IA and IIA alkali or alkaline earth materials. Smaller ions such as lithium and sodium are preferred to larger ions as potassium and rubidium since ionic mobility in the electrochromic layer may be a limiting factor. The significant improvements in electrode reversibility and reproducibility and the important advantage of long term stability of operation by use of these gels were unexpected. This is a significant advantage in applications requiring long term service stability. Thus, alpha numeric character presentation and data display devices, wherein the service requirement is stated in years and/or millions of cycles, have become commercially feasible.

A solid, inorganic material may also be used as the ion-conducting spacing layer, e.g. silicon oxide, calcium fluoride, magnesium fluoride and the like, as described in U.S. Pat. No. 3,521,941.

Additive Compounds

The compounds that can be added to the electrolyte spacing layer are those used in the imaging layer. Preferably, the additive compound is the same as that of the imaging layer. $WO_3$ for example, is an effective additive when using a $WO_3$ imaging layer. The additives are used in an amount to form a 50 to 100% saturated solution.

Counter Electrode

As previously indicated, the common counter-electrode may be any electrically conductive material. Particularly advantageous is a layer of electrochromic material, as described previously. It is also advantageous to use the same electrochromic material for the imaging area and counter-electrode. A mixture of graphite and an electrochromic material, or graphite alone may be used as the counter-electrode. Other metallic counter-electrodes are disclosed in copending application, Ser. No. 609,251, filed Apr. 13, 1974.

The invention may be further understood by reference to the drawings in which

Figures 1, 2, 3:
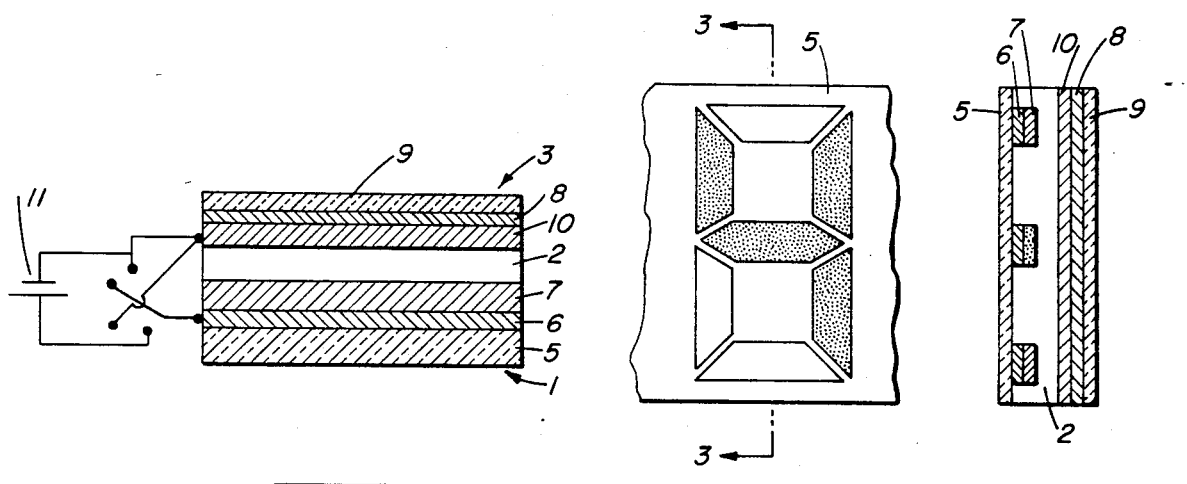
FIG. 1 is a cross section of the electrochromic display device.
FIG. 2 is a front view of a unitary segmented electrochromic alpha-numeric digital display.
FIG. 3 is a cross-sectional view of the segmented display of FIG. 2, taken along the lines 3—3.

As shown in FIG. 1, an EC information display has a transparent EC Electrode 1, light colored, pigmented ion conducting medium layer 2 and opaque counter-electrode 3. The EC electrode 1 forms the viewing surface and has a transparent or translucent substrate 5, e.g. glass, with a conductive layer 6, e.g. tin oxide, and an electrochromic layer 7. The counter-electrode 3 is also a composite of a conductive layer 8 on a substrate 9, and a counter-electrode material 10 such as carbon, tungsten oxide, or a mixture thereof. A suitable substrate for the viewing area and counter-electrode is NESA glass, which is glass having a thin transparent layer of tin oxide.

When battery 11 is connected to make counter-electrode 3 positive, EC electrode layer 7 colors. When the connections are reversed, EC layer 7 erases (or bleaches).

Figure 4:
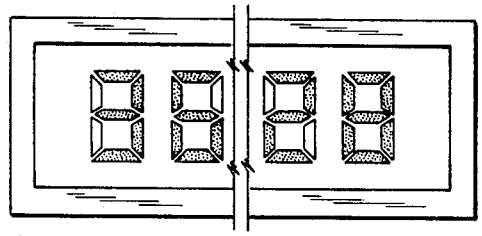
FIG. 4 is a front view of a multiple digit display according to the invention.

In FIGS. 2, 3 and 4 are shown electrochromic devices with the EC layer 7 in the form of a plurality of segments in contact with common ion-conducting layer 2 in turn in contact with common counter-electrode 10. These segments may be selectively activated to show numbers. FIG. 2 shows the number "4". Appropriate logic circuitry, well known in the art, is used to color particular segments in a desired sequence to form a desired display of numbers. It is also within the scope of this invention to use other styles of segmented displays, known in the art to provide display of both letters and numbers.

Figure 5:
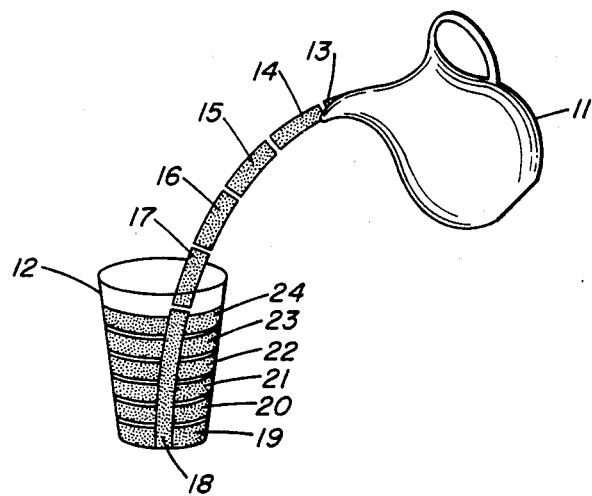
FIG. 5 is a front view of a pictorial segmented animated display.

FIG. 5 shows a pictorial segmented display which operates as an animated display. The device shown consists of a pictorial representation of a pitcher 11 and a glass 12, with a plurality of separate EC segments to represent a stream of fluid and a filled up glass. By the use of appropriate electronic circuitry, which is within the skill of the art, the segments, which are initially colorless, may be colored in sequence to give the impression of a pouring stream of fluid and a filling glass. The sequence would be: color in the following order segments 13 to 24. At this point the glass appears full and the stream is still pouring. Then erase in the following order segments 13 to 17. At this time there is a full glass and no pouring stream. To repeat the display, segments 18 to 24 are erased simultaneously so that the glass is empty. The entire sequence is then repeated. It will be obvious that the glass and pitcher are only illustrative of the many different animated displays which may be formed according to the invention.

The present segment display system is usual in any information display. Some alpha-numeric applications are in watch and clock faces, automobile dashboard displays, watch and clock faces, automobile dashboard displays, electronic calculators, telephone displays, aircraft instrument panels, instrument displays, large sign or panel displays indoor and outdoor, radio or television channel display, sports scoreboards, cash register displays, war room displays, transportation arrival and departure displays, scales, gasoline pump indicators, and the like. The display could also be used to present pictorial information. The display of the invention would be well suited to a combination electronic wristwatch and calculator using integrated circuits for the timing and mathematical functions the same numerical display for both, with switching means to apply the appropriate circuitry to the display.

The following examples show specific embodiments and modes of practice of the invention and are not intended to be limitative.

EXAMPLE 1

A counter-electrode was prepared as follows: Dixon Crucible Co. Graphokote No. 120 was brushed on a clean substrate of NESA Glass. While the Graphokote 120 film was still wet, $WO_3$ power was sprinkled onto the surface. Air drying for ½ hour at 25° C. and baking at 300° C. for ½ hour followed. The electrode was cooled to 25° C. and soaked in a solution of glycerin-sulfuric acid 10:1 by volume for 24 hours minimum, rinsed with acetone and baked at 90° C. for ½ hour to dry. The resulting deposit was composed of approximately 0.5 gm./cm$^2$ $WO_3$ on 2.0 mg./cm$^2$ Graphokote 120.

EXAMPLE 2

An electrochromic device was constructed from two NESA glass plates. One conductive NESA plate was coated with a 0.5 micron thick evaporated film of tungsten oxide. The other NESA plant was a counter-electrode as in Example 1. The glass plates so formed were pressed together with the electrochromic and graphite films facing each other but separated by a 0.6 mm. thick sealing ring and spacer which retained an ionically conductive paste consisting of a $TiO_2$ glycerin. This paste was saturated with $WO_3$. This was accomplished by adding a surplus of $WO_3$ to the glycerin and sulfuric acid mixture and storing for several days at 50° C. The saturated solution was then poured off leaving the solids behind. The solution was then mixed with the $TiO_2$ pigment. This device was cycled from color to clear and back to color at an applied potential of 1.1 volts D.C. with half cycles of 100 milli-seconds. The device underwent 8 million cycles of switching at 60 cycles per minute without observable deterioration.

EXAMPLE 3

An electrochromic numeric device was constructed in the form of a seven segment numeric display by using a photo resist method to provide vapor deposition of $WO_3$ in segments.

Starting with a conductive NESA plate, WO$_3$ was vapor deposited through a thin mask of stainless steel to form 7 segments in the form of 8. Using a glass scribe, the NESA was scribed to provide seven electrical circuits for the seven segments. A counter-electrode structure consisting of porous graphite bonded with fibrillated teflon and pressed into a metal screen was in turn bonded to glass with a silicone rubber adhesive and a spacer was set in place. The spacer volume was filled with an electrolyte paste of 10:1 Glycerin and H$_2$SO$_4$ with sun yellow C Pigment added. The edges were sealed with silicone rubber. This device was switched for 90,000 cycles before any numeric fading was noted.

I claim:

1. A variable information display device which comprises a light transmitting substrate having multiple separate discrete segments of persistent electrochromic material as a light modulating medium, a common counter electrode, and a common layer of an ion conducting material in contact with said electrochromic material and said counter-electrode, said segments being arranged so as to display variable animated pictorial arrangements when selected segments are in a bleached or colored state, electrode means connected to each segment, and an electrical source to power each segment selectively so as to display desired arrangements.

2. The device of claim 1, wherein said counter-electrode includes persistent electrochromic material.

3. The device of claim 2, wherein the electrochromic materials in each said layer are identical.

4. The device of claim 1, wherein at least one of the electrodes is substantially transparent.

5. The device of claim 3, wherein said electrochromic materials are WO$_3$.

6. A device as in claim 1, wherein said electrolyte contains a gelling agent.

* * * * *